United States Patent
Machida et al.

(10) Patent No.: US 9,505,095 B2
(45) Date of Patent: Nov. 29, 2016

(54) POWER TOOL

(75) Inventors: Yoshitaka Machida, Anjo (JP); Masanori Furusawa, Anjo (JP)

(73) Assignee: MAKITA CORPORATION, Anjo-shi (JP)

(*) Notice: Subject to any disclaimer, the term of this patent is extended or adjusted under 35 U.S.C. 154(b) by 743 days.

(21) Appl. No.: 13/418,759

(22) Filed: Mar. 13, 2012

(65) Prior Publication Data

US 2012/0234570 A1 Sep. 20, 2012

(30) Foreign Application Priority Data

Mar. 16, 2011 (JP) ................. 2011-058351

(51) Int. Cl.
*B25D 17/14* (2006.01)
*B23Q 11/00* (2006.01)
*B25F 5/02* (2006.01)

(52) U.S. Cl.
CPC ............ *B23Q 11/0046* (2013.01); *B25F 5/02* (2013.01); *Y02P 70/171* (2015.11)

(58) Field of Classification Search
CPC ..... B25F 5/00; B25B 21/00; B23B 2220/08; B23B 47/34; B23B 51/103; B22F 2003/247; B23C 2210/40
USPC ............ 173/20, 29, 178, 48, 47, 21, 7, 131, 173/132, 170–171, 198
See application file for complete search history.

(56) References Cited

U.S. PATENT DOCUMENTS

| | | | | |
|---|---|---|---|---|
| 3,735,824 A * | 5/1973 | Astrom | ........... | B23Q 1/015 173/210 |
| 3,781,024 A * | 12/1973 | Ganser | ........... | B23Q 1/0036 173/75 |
| 3,850,254 A * | 11/1974 | Hirdes | ........... | B23Q 11/0046 173/75 |
| 3,910,360 A * | 10/1975 | Sundstrom | ........... | E21B 21/07 173/3 |
| 4,207,953 A * | 6/1980 | Reibetanz | ........... | B23B 49/006 173/21 |
| 4,209,069 A * | 6/1980 | Smith | ........... | B23Q 11/0046 173/75 |
| 5,129,467 A * | 7/1992 | Watanabe et al. | ........... | 173/75 |
| 5,199,501 A * | 4/1993 | Kluber | ........... | B23Q 11/0046 173/171 |
| 5,467,835 A * | 11/1995 | Obermeier | ........... | B23Q 11/0046 173/75 |
| 5,544,977 A * | 8/1996 | Cravy et al. | ........... | 405/184.3 |
| 5,727,910 A * | 3/1998 | Leeb | ........... | 407/34 |
| 5,772,367 A * | 6/1998 | Daniel | ........... | B23Q 11/0046 173/75 |
| 6,641,634 B2 * | 11/2003 | Reich | ........... | B23Q 11/0046 173/207 |
| 6,681,756 B1 * | 1/2004 | Kilpatrick | ........... | 125/41 |
| 7,178,217 B2 * | 2/2007 | Barnett | ........... | B23C 3/30 29/557 |

(Continued)

FOREIGN PATENT DOCUMENTS

| | | |
|---|---|---|
| EP | 1 459 842 B1 | 8/2006 |
| EP | 1 872 900 A2 | 1/2008 |

OTHER PUBLICATIONS

European Search Report issued in European Patent Application No. 12159439.4 dated Jul. 23, 2012.

(Continued)

*Primary Examiner* — Robert Long
(74) *Attorney, Agent, or Firm* — Oliff PLC

(57) ABSTRACT

A power tool comprising: a body (103); a dust catching attachment (120) attachable to the body (103); an engagement mechanism portion (151) which engages the body (103) with the dust catching attachment (120); and a spacing member that biases the body (103) and the dust catching attachment (120) in a state that the body (103) and the dust catching attachment (120) are engaged to each other by the engagement mechanism portion (151).

9 Claims, 7 Drawing Sheets

(56) References Cited

U.S. PATENT DOCUMENTS

| | | | | |
|---|---|---|---|---|
| 7,354,226 | B2* | 4/2008 | Britz | B23Q 11/0046 144/252.1 |
| 7,425,109 | B2* | 9/2008 | Simm | B23Q 11/0046 173/198 |
| 7,794,184 | B2* | 9/2010 | Di Nicolantonio | B23B 47/00 408/110 |
| 7,840,253 | B2* | 11/2010 | Tremblay et al. | 600/424 |
| 7,896,445 | B2* | 3/2011 | Bechem | 299/85.1 |
| 8,342,782 | B2* | 1/2013 | Nishikawa | B23Q 11/006 173/198 |
| 8,696,271 | B2* | 4/2014 | Dickey | 409/132 |
| 8,915,309 | B2* | 12/2014 | Kakiuchi | B23Q 11/0046 173/171 |
| 8,997,887 | B2* | 4/2015 | Furusawa | B23Q 11/0046 173/198 |
| 9,114,491 | B2* | 8/2015 | Kakiuchi | B23Q 11/0046 |
| 2002/0129949 | A1* | 9/2002 | Bongers-Ambrosius | B08B 15/04 173/217 |
| 2002/0141836 | A1* | 10/2002 | Ege | B23Q 11/0046 408/67 |
| 2002/0145724 | A1* | 10/2002 | Wursch | B23B 49/008 356/4.01 |
| 2002/0154960 | A1* | 10/2002 | Lin | B23Q 11/0046 408/67 |
| 2004/0231871 | A1 | 11/2004 | Arich et al. | |
| 2004/0251041 | A1 | 12/2004 | Grossman | |
| 2006/0153650 | A1* | 7/2006 | Simm | B23Q 11/0046 408/58 |
| 2008/0202781 | A1* | 8/2008 | Nishikawa | B23Q 11/0046 173/104 |
| 2010/0155095 | A1* | 6/2010 | Furusawa | B23Q 11/0046 173/198 |
| 2011/0008117 | A1* | 1/2011 | Kasuya | B23Q 11/0046 408/67 |
| 2011/0008118 | A1* | 1/2011 | Yoshikane | B23Q 11/0046 408/67 |
| 2011/0226499 | A1* | 9/2011 | Kakiuchi | B23Q 11/0046 173/75 |
| 2011/0226502 | A1* | 9/2011 | Bito | B23Q 11/0046 173/197 |
| 2011/0308830 | A1* | 12/2011 | Furusawa et al. | 173/198 |
| 2012/0063856 | A1* | 3/2012 | Miwa | B23Q 11/0046 408/67 |
| 2012/0234570 | A1* | 9/2012 | Machida | B23Q 11/0046 173/197 |
| 2012/0273243 | A1* | 11/2012 | Tada et al. | 173/198 |
| 2012/0298391 | A1* | 11/2012 | Kakiuchi et al. | 173/77 |
| 2012/0318553 | A1* | 12/2012 | Chen et al. | 173/198 |
| 2013/0031879 | A1* | 2/2013 | Yoshikane | B23Q 11/0046 55/356 |
| 2013/0055523 | A1* | 3/2013 | Yoshikane | B28D 7/02 15/347 |
| 2013/0213683 | A1* | 8/2013 | Brewster | B23Q 11/00 173/198 |
| 2013/0319711 | A1* | 12/2013 | Simm | A47L 9/1409 173/197 |
| 2014/0138114 | A1* | 5/2014 | Takeuchi | B23Q 11/0071 173/198 |

OTHER PUBLICATIONS

Aug. 28, 2014 Office Action issued in Japanese Patent Application No. 2011-058351 (with translation).

\* cited by examiner

POWER TOOL

CROSS REFERENCE TO RELATED APPLICATION

The present application claims priority from Japanese Patent Application No. 2011-58351, filed on Mar. 16, 2011, the disclosure of which is incorporated herein by reference in its entirety.

FIELD OF THE INVENTION

The invention relates to a power tool having a dust catching device to catch a dust during the power tool is operating against a workpiece.

BACKGROUND OF THE INVENTION

European Patent Application EP 1459842 discloses an attaching construction of a dust catching device which is attachable to a power tool body of a power tool operating a hammer operation or a hammer drill operation like that. The attaching construction has a plurality of mechanical engaging portions respectively including a recessing portion and a protruding portion so that the recessing portions and the protruding portions are engaged to each other. Each mechanical engaging portion is arranged respectively at one area among several areas distantly separated to other area. Said a plurality of mechanical engaging portions is adapted to make the recessing portion and the protruding portion engage to each other thereof the dust catching device is attached to the power tool body. Further, in a state that each the recessing portion and the protruding portion is engaged to each other respectively, the dust catching device is locked to the power tool body by means of a locking mechanism.

According to the attaching construction of the dust catching device described above, the dust catching device is attached to the power tool body, however an improvement of the attaching construction to simplify is to be further considered.

SUMMARY OF THE INVENTION

Problem to be Solved by the Invention

An object of the invention is, in consideration of the above described problem, to provide a technique to simplify an attaching construction of a dust catching device to a power tool.

Means for Solving the Problem

Above-mentioned object is achieved by the claimed invention. According to a preferred aspect of the invention, a power tool comprising: a tool body; a dust catching device attachable to the tool body; an engagement portion which engages the tool body with the dust catching device; and a spacing member that biases the tool body and the dust catching device in a state that the tool body and the dust catching device are engaged to each other by the engagement portion. Further, the engagement portion typically includes a recessing portion and a protruding portion which are engageable to each other, thereof the tool body and the dust catching device are engaged by means of an engagement of the recessing portion and the protruding portion. In this case, the spacing member is preferably located between the tool body and the dust catching device. Further, the spacing member is preferably disposed on the dust catching device.

According to the aspect of the invention, in a state that the dust catching device is engaged to the tool body by means of the engagement portion, because the tool body and the dust catching device are adapted to be biased by the spacing member, a backlash of the dust catching device against the tool body is regulated by the spacing member. Therefore, the dust catching device is stably attached to the tool body. Further, because the tool body and the dust catching device are biased by the spacing member disposed between the tool body and the dust catching device, an engagement construction of the dust catching device to the tool body is more simplified than an example construction in which a plurality of recessing portions and protruding portions which are mechanically engaged to each other are included.

According to a further preferable aspect of the invention, the tool body includes a first surface and a second surface, and the dust catching device includes a third surface and a forth surface. In a state that the tool body and the dust catching device are engaged to each other by the engagement portion, the first surface and the third surface face to each other and the second surface and the for the surface face to each other. And the spacing member is located between the second surface and the forth the surface. Further, the first surface and the second surface may be not only paralleled to each other but also crossed to each other. According to the aspect of the invention, a rotational movement of the dust catching device around the engagement portion against the tool body is elastically supported by the spacing member, therefore the rotational movement is effectively regulated.

According to a further preferable aspect of the invention, the first surface and the second surface are located distantly each other. And the third surface and the forth surface are located distantly to each other. According to the aspect of the invention, a rotational movement of the dust catching device around the engagement portion against the tool body is elastically supported by the spacing member at a part distant from the engagement portion.

According to a further preferable aspect of the invention, the spacing member includes a wedge-shaped member and a biasing member configured to biasing the wedge-shaped member. And the wedge-shaped member biases the tool body and the dust catching device by means of a biasing force of the biasing member. According to the aspect of the invention, because the tool body and the dust catching device are biased by the wedge-shaped member biased by the biasing member, a gap between the tool body and the dust catching device, despite of a size of the gap, is filled effectively.

According to a further preferable aspect of the invention, the tool body includes a fifth surface connecting to the first surface and the second surface, and the dust catching device includes a sixth surface connecting to the third surface and the forth surface. In a state that the tool body and the dust catching device are engaged to each other by the engagement portion, the fifth surface and the sixth surface face to each other. According to the aspect of the invention, the first surface and the second surface are easily separated to each other. And the third surface and the forth surface are also easily separated to each other.

According to a further preferable aspect of the invention, the engagement portion includes a guide groove extending in a first direction and a guide rail engageable to the guide groove. A direction of a biasing force of the spacing member crosses the first direction. Further, the spacing member is located between the second surface and the forth surface. Further, the guide groove is disposed at one side among the first surface and the third surface, and the guide rail is disposed at the other side among the first surface and the third surface. According to the aspect of the invention, when the guide rail is moved to engage to the guide groove, the spacing member is disposed between the tool body and the dust catching attachment. Therefore, the dust catching attachment is attached by a one-touch operation thereof an attaching operation of the dust catching attachment is simplified effectively.

According to a further preferable aspect of the invention, the power tool further comprises a locking member. The locking member locks the engagement portion in a state that the tool body and the dust catching device are engaged to each other by the engagement portion. According to the aspect of the invention, the dust catching attachment is regulated to move relatively against the tool body and/or be detached from the tool body unexpectedly.

According to a further preferable aspect of the invention, the power tool is defined as a hammer drill which actuates a tool attached on a front portion of the tool body along a longitudinal direction of the tool and around the longitudinal direction. Further, the power tool comprises an attached portion to which the dust catching device is attached.

According to the invention, a technique of an attaching construction of a dust catching device to a power tool to simplify is improved. Other objects, features and advantages of the invention will be readily understood after reading the following detailed description together with the accompanying drawings and the claims.

DESCRIPTION OF THE PREFERRED EMBODIMENTS

Each of the additional features and method steps disclosed above and below may be utilized separately or in conjunction with other features and method steps to provide and manufacture improved power tools and method for using such power tools and devices utilized therein. Representative examples of the invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

Figure 1:
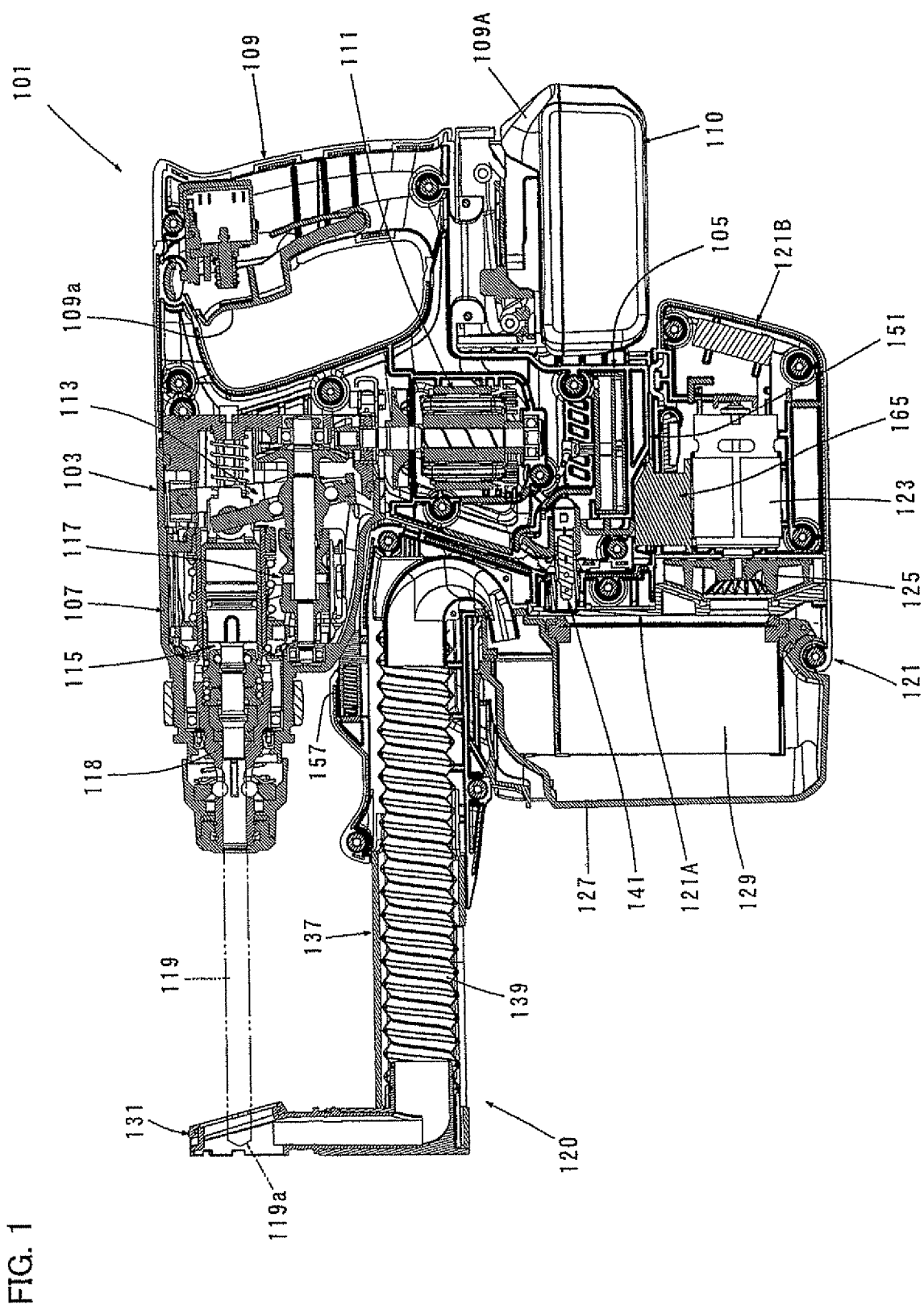
FIG. 1 shows a side cross-sectional view of a whole composition of a hammer drill being attached a dust catching attachment.
Figure 2:
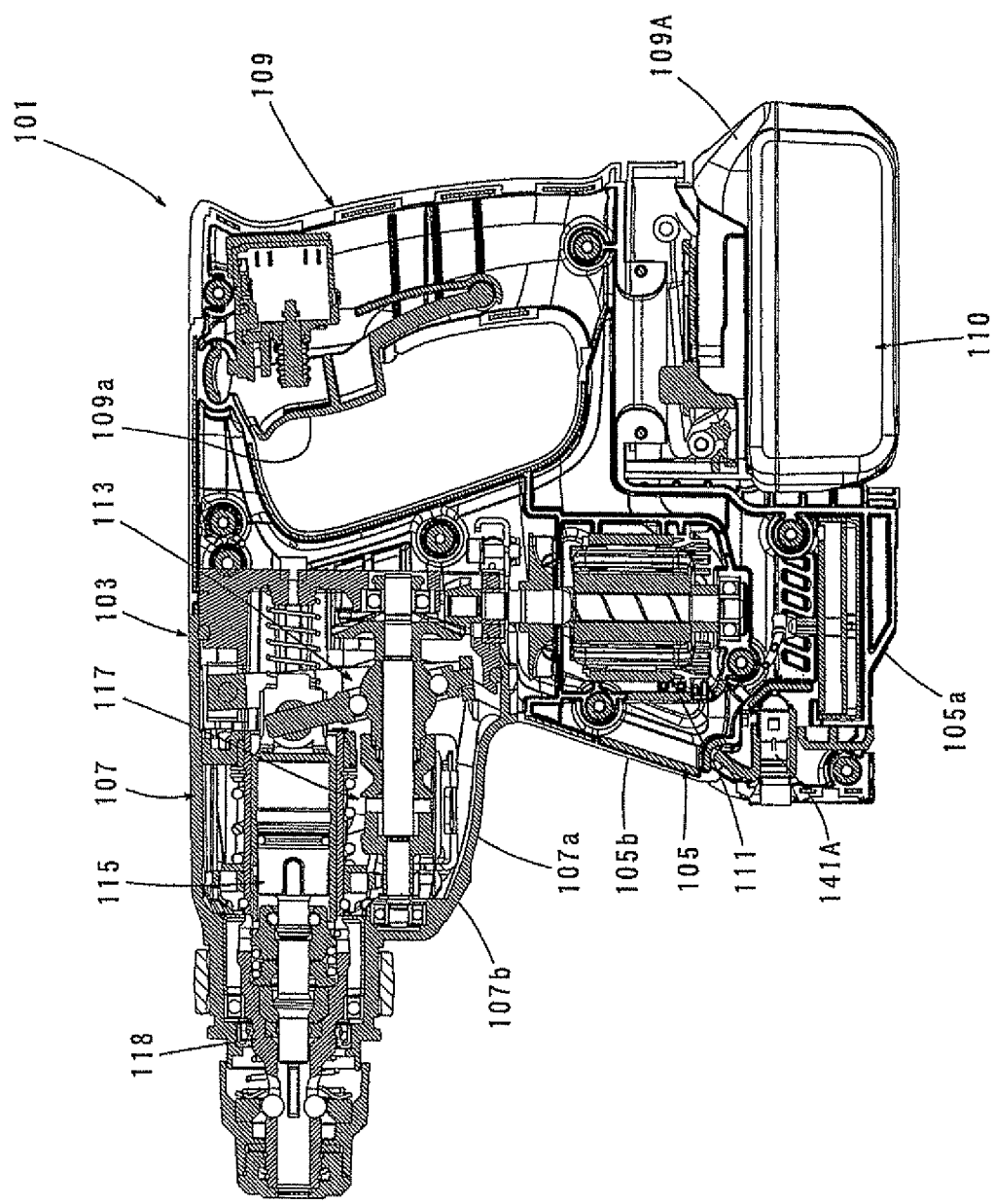
FIG. 2 shows a cross-sectional view of the hammer drill being attached the dust catching attachment.

Next, an embodiment of the invention will be explained with reference to FIG. 1 to FIG. 7. In this embodiment, a power tool will be explained as a hammer drill with a chargeable battery which is one example of the power tool. As shown in FIG. 1 and FIG. 2, generally a hammer drill 101 of the embodiment is mainly provided with a body 103, a hammer bit 119 as a tool bit, and a hand grip 109. The body 103 defines an outline of the hammer drill 101. The hammer bit 119 is attachable to a front side of the body 103 via a tool holder 118. The hand grip 109 is provided at an opposite side opposed to the hammer bit 119 of the body 103 and connected to the body 103. The body 103 corresponds to a tool body of the invention.

The hand grip 109 is provided as a main handle held by a user. The hammer bit 119 is attached to the tool holder 118 relatively movable with respect to the body 103 in a longitudinal direction of the hammer bit 119, and regulated a relative rotation against the tool holder 118 in a circumference direction of the hammer bit 119. For convenience of explanation, a side which the hammer bit 119 is attached to the body 103 is called forward or a front side of the hammer drill 101, and the other side is called backward or a rear side of the hammer drill 101.

The body 103 is mainly provided with a motor housing 105 and a gear housing 107. The motor housing 105 houses a driving motor 111. The gear housing 107 houses a motion changing mechanism 113 as a driving mechanism, a hammering member 115 and a motion transmission mechanism 117. The motor housing 105 is disposed at the rear side and a lower side of the gear housing 107 and connected to the gear housing 107. The hand grip 109 is disposed so as to extend in a vertical direction crossing the longitudinal direction of the hammer bit 119 and further an upper end and a lower end of the hand grip 109 is connected to the body 103. Therefore, the hand grip 109 is formed as a loop-shaped handle (D-shaped handle). A battery attached portion 109A is disposed at a lower side of the hand grip 109. A chargeable battery 110 is attachable to the battery attached portion 109A.

The motion changing mechanism 113 is mainly provided with a swinging mechanism which includes a swing ring to swing. A rotational output of the driving motor 111 is changed to a liner motion by the motion changing mechanism 113 and transmitted to the hammering element 115. Further, the hammer bit 119 is exerted a hammering power in the longitudinal direction to lateral direction of FIG. 1) via the hammering element 115. On the other hand, the motion transmission mechanism 117 is mainly provided with a plurality of gears. The rotational output of the driving motor 111 is decelerated by the motion transmission mechanism 117 and transmitted to the hammer bit 119 as a final axis via the tool holder 118. In this way, the hammer bit 119 is rotated in the circumference direction. The driving motor 111 is disposed at a lower side with respect to the longitudinal direction of the hammer bit 119 so that a direction of a rotational axis of the driving motor 111 crosses the longitudinal direction of the hammer bit 119. The driving motor 119 is driven when a trigger 109a disposed on the hand grip 109 is pulled by a user. Further, a detailed explanation of an actuation of the hammer bit 119 by the motion changing mechanism 113, the hammering element 115 and the motion transmission mechanism 117 is omitted for convenience.

The hammer drill 101 is adapted to be switchable among two operating modes which includes a drill-mode and a hammer-drill-mode. In the drill-mode, the hammer bit 119 is given only a rotational power in the circumference direction to operate a drill operation against a workpiece. And in the hammer-drill-mode, the hammer bit 119 is given a rotational power in the circumference direction and a hammering power in the longitudinal direction to operate a hammer drill operation against a workpiece. A explanation of a switching mechanism is omitted for convenience.

Next, a dust catching attachment 120 will be explained with mainly reference to FIG. 3, which is attachable to the hammer drill 101 described above. The dust catching attachment 120 is configured to vacuum a dust which is produced by an operation of the hammer drill 101 against a workpiece. The dust catching attachment 120 corresponds to a dust catching device of the invention.

The dust catching attachment 120 in this embodiment is defined as a built-in vacuum mechanism system which includes an attachment body 121 housing a motor 123 for catching a dust and a vacuum fan 125. The dust catching attachment 120 is attachable to an attached portion of the body 103 which is disposed at a front and lower side of the body 103. The dust catching attachment 120 is attached to the attached portion by horizontal movement from the front side to the rear side of the body 103 in the longitudinal direction of the hammer bit 119. An attaching construction of the dust catching attachment 120 will be explained later.

As shown in FIG. 2, the dust catching attachment 120 is mainly provided with the attachment body 121, a dust vacuuming portion 131, a dust transmitting portion 137, a dust holder 127, the vacuum fan 125 and a motor 123. When the vacuum fan 125 is actuated by the motor 123, a vacuuming force is arisen at the dust vacuuming portion 131 through an inner space of the dust holder 127 and the dust transmission portion 137. A dust produced during the hammer drill 101 is operating, is vacuumed from a dust inlet 133a by means of the vacuuming force of the dust vacuuming portion 131 and transmitted to the dust holder 127 through the dust transmission portion 137.

The attachment body 121 is formed as an approximately L-shaped member which has a vertical portion and a horizontal portion. The vertical portion extends approximately linearly downward from a rear end of the dust transmission portion 137. The horizontal portion extends backward from a lower end of the vertical portion. The vertical portion is defined as a holder attached portion 121A to which the dust holder 127 is attached. The vertical portion is defined as a motor housing portion 121E in which the motor 123 is housed.

The motor 123 is disposed inside of the motor housing portion 121E so that a rotational axis is paralleled to the longitudinal direction of the hammer bit 119 (a longitudinal direction of the dust transmission portion 137). The motor 123 actuates the vacuum fan 125 disposed forward of the motor 123 to arise the vacuuming force in the dust holder 127. The vacuuming force impinges on the dust vacuuming portion 131 via through the dust holder 127 to the dust transmission portion 137.

The dust holder 127 is formed as a box-shaped member and disposed at a backward and lower portion of the dust transmission portion 137. The dust holder 127 is detachably attached to the holder attached portion 121A. The filter 129 is disposed inside the dust holder 127. The dust holder 127 has an inlet 126 configured to intake a dust transmitted through an inner space of the dust transmission portion. The inlet 126 is disposed at an upper side of the dust holder 127. Further, the dust holder 127 has an air outlet 128 configured to exhaust an air filtrated by the filter 129. The air outlet 128 is disposed at a lower side of the dust holder 127. The air outlet 128 faces to the vacuum fan 125.

The dust vacuuming portion 131 is provided with a vacuuming cylinder 133 which has the dust inlet 133a at a front side of the vacuuming cylinder 133, and a vacuuming body 135 formed as a hallow member which extends downward crossing the longitudinal direction of the hammer bit 119 from the vacuuming cylinder 133 to the dust transmission portion 137 to which a lower end of the vacuuming body 135 is connected. In a state that the dust catching attachment 120 is attached to the body 103, the hammer bit 119 penetrates a rear wall 133b disposed at a rear side of the vacuuming cylinder 133 and extends forward from the dust inlet 133a. Further, the vacuuming cylinder 133 distantly surrounds a tip portion 119a (refer to FIG. 1) of the hammer bit 119 with a predetermined distance. Namely, the vacuuming cylinder 133 is defined as a dust vacuuming member and contacted with a workpiece during the hammer drill 101 is operating an operation against a workpiece. A dust vacuumed into the vacuuming cylinder 133 is transmitted to the dust transmission portion 137 through an inner space of the vacuuming body 135.

The dust transmission portion 137 connected to the vacuuming body 135 is disposed distantly from the hammer bit 119 with respect to a direction crossing the longitudinal direction of the hammer bit 119 and extends so as to be parallel to the longitudinal direction of the hammer bit 119. An operation against a workpiece by the hammer bit 119 is operated in a state that the vacuuming cylinder 133 is pressed against the workpiece in conjunction with the hammer bit 119. While the operation, since the hammer bit 119 is entered into inside of the workpiece, the dust vacuuming portion 131 having the vacuuming cylinder 133 being pressed against the workpiece is displaced relatively to a rear side of the body 103.

In order to displace the dust vacuuming portion 131 to the rear side of the body 103, the dust transmission portion 137 is formed as a dust transmission cylinder being expandable and contractable. The dust transmission portion 127 extends so as to be parallel to the hammer bit 119. The dust transmission portion 137 being expandable and contractable is provided with a movable cylinder 137A which is slidable in its longitudinal direction and a fixed cylinder 137B. The fixed cylinder 137B defines a part of the attachment body 121. In this way, the dust vacuuming portion 131 is connected to the attachment body 121 and movable in the longitudinal direction of the hammer bit 119 with respect to the attachment body 121 via the dust transmission portion 137.

An accordion hose 139 being expandable and contractable is disposed inside the movable cylinder 137A and the fixed cylinder 137B. A dust is transmitted through inside of the accordion hose 139. A front side of the accordion hose 139 is connected to a rear side of the vacuuming body 135 and further a rear side of the accordion hose 139 is connected to a rear side of the fixed cylinder 137B. The accordion hose 139 is connected to the inlet 126 of the dust holder 127.

Further, the dust transmission portion 137 is held in an expanded state by means of a restorative force of the accordion hose 139. In this way, the accordion hose 139 is disposed inside of the movable cylinder 137A and the fixed cylinder 137B, and a dust is transmitted through inside of the accordion hose 139. Therefore, a dust is prevented from entering a portion between the movable cylinder 137A and the fixed cylinder 137B.

Next, an attaching construction of the dust catching attachment 120 to the body 103 of the hammer drill 101 described above will be explained with reference to FIG. 3 to FIG. 7. The dust catching attachment 120 is attached to the body 103 of the hammer drill 101 by being horizontally moved with respect to the body 103 in the longitudinal direction of the hammer bit 119 from the front side to the rear side of the hammer drill 101. The dust catching attachment 120 is attached so as to be hung to a lower portion of the front side of the body 103.

As shown in FIG. 2, the body 103 of the hammer drill 101 has an attached portion which is provided on a lower surface 105a of the motor housing 105, a front surface 105b of the motor housing 105 and a lower surface 107a of the gear housing 107, thereof the attached portion is formed as a substantially Z-shaped in a side view. In accordance with the attached portion, the attachment body 121 has an attaching portion which is provided on a upper surface 121b of the motor housing portion 1213, a rear surface 121a of the holder attached portion 121A and a upper surface 137b of the fixed cylinder 137B, thereof the attaching portion is formed as a substantially Z-shaped in a side view.

Namely, the upper surface 121b of the motor housing portion 121B and the lower surface 105a of the motor housing 105 face to each other. The upper surface 121b corresponds to a third surface of the invention. And the lower surface 105a corresponds to a first surface of the invention. Further, the rear surface 121a of the holder attached portion 121A and the front surface 105b of the motor housing 105 face to each other. The rear surface 121a corresponds to a sixth surface of the invention. And the front surface 105b corresponds to a fifth surface of the invention. Further, the upper surface 137b of the fixed cylinder 1373 and the lower surface 107a of the gear housing 107 face to each other. The upper surface 137b corresponds to a forth surface of the invention. And the lower surface 107a corresponds to a second surface of the invention.

An engagement mechanism portion 151 is adapted to engage the dust catching attachment 120 and the body 103 of the hammer drill 101 to each other and is provided between the upper surface 121b of the motor housing portion 1213 and the lower surface 105a of the motor housing 105. As shown in FIG. 4 to FIG. 7, the engagement mechanism portion 151 is provided with a guide groove 153 as a recess having a pair of grooves and a guide rail 155 as a convex having a pair of rails. The guide groove 153 and the guide rail 155 are adapted to engage to each other. The engagement mechanism portion 151 corresponds to an engagement portion of the invention.

The guide groove 153 is disposed on the motor housing 105 and has the pair of grooves extending in the longitudinal direction of the hammer bit 119 thereof the pair of grooves are parallel to the longitudinal direction. The guide groove 153 is disposed at a lower part of a side surface of the motor housing 105. The groove is formed as a substantially U-shaped groove which is laterally opened. Further, the groove is opened at least a front end of the groove with respect to a direction in which the groove is extending. The guide rail 155 is disposed at an upper end of both of side walls of the motor housing portion 121B and formed as flanges facing inwardly to each other. Accordingly, in a state that a rear end of the guide rail 155 is located at a front end of the guide groove 153, the dust catching attachment 120 is horizontally moved relatively in the longitudinal direction of the hammer bit 119 from frontward to rearward of the body 103 of the hammer drill 101 thereof the guide rail 155 is engaged in the guide groove 153. Therefore, the dust catching attachment 120 is attached and hung on the body 103. A direction to which the guide groove 153 is extending corresponds to a first direction of the invention.

Figure 3:
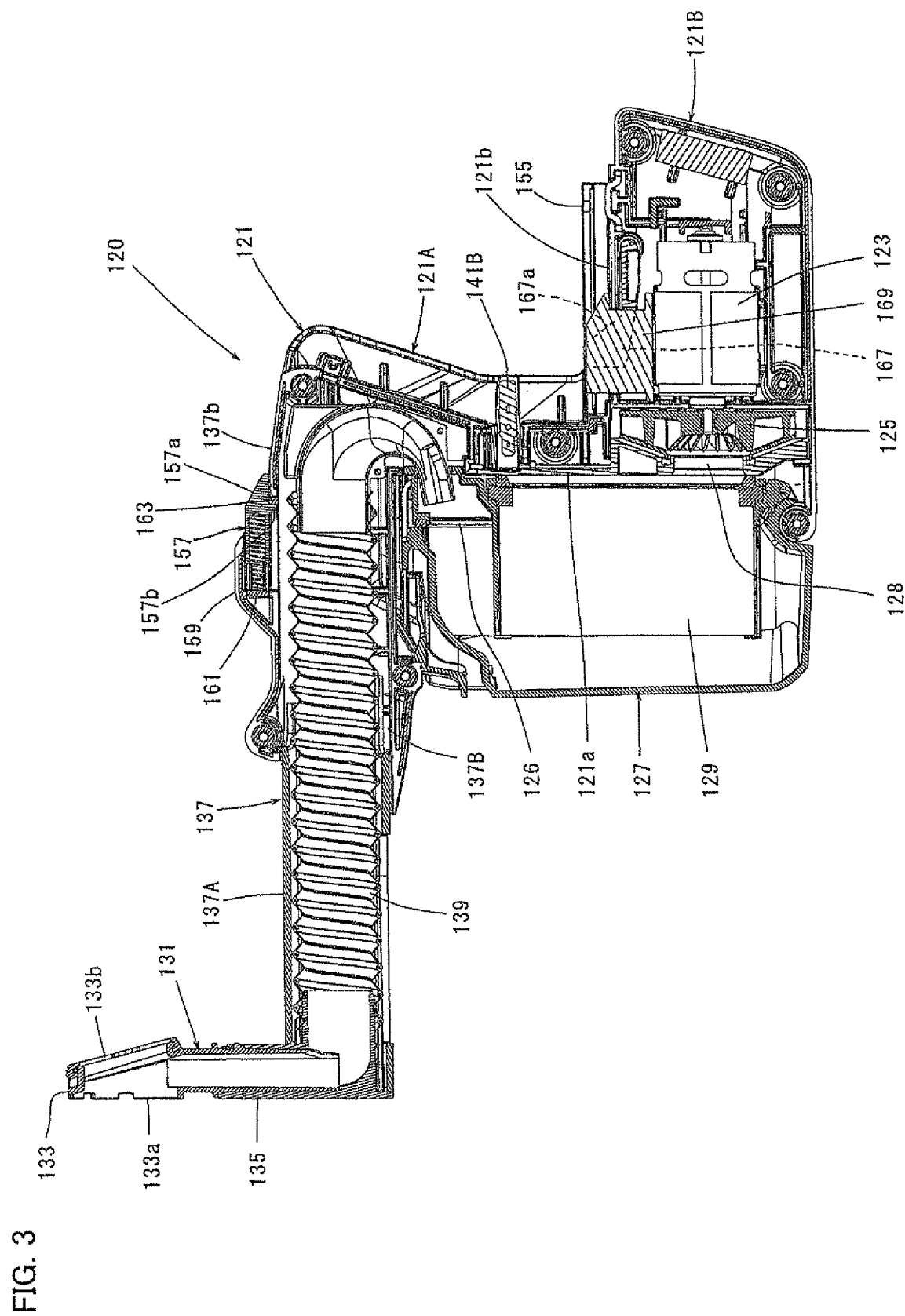
FIG. 3 shows a cross-sectional view of a whole composition of the dust catching attachment.
Figure 4:
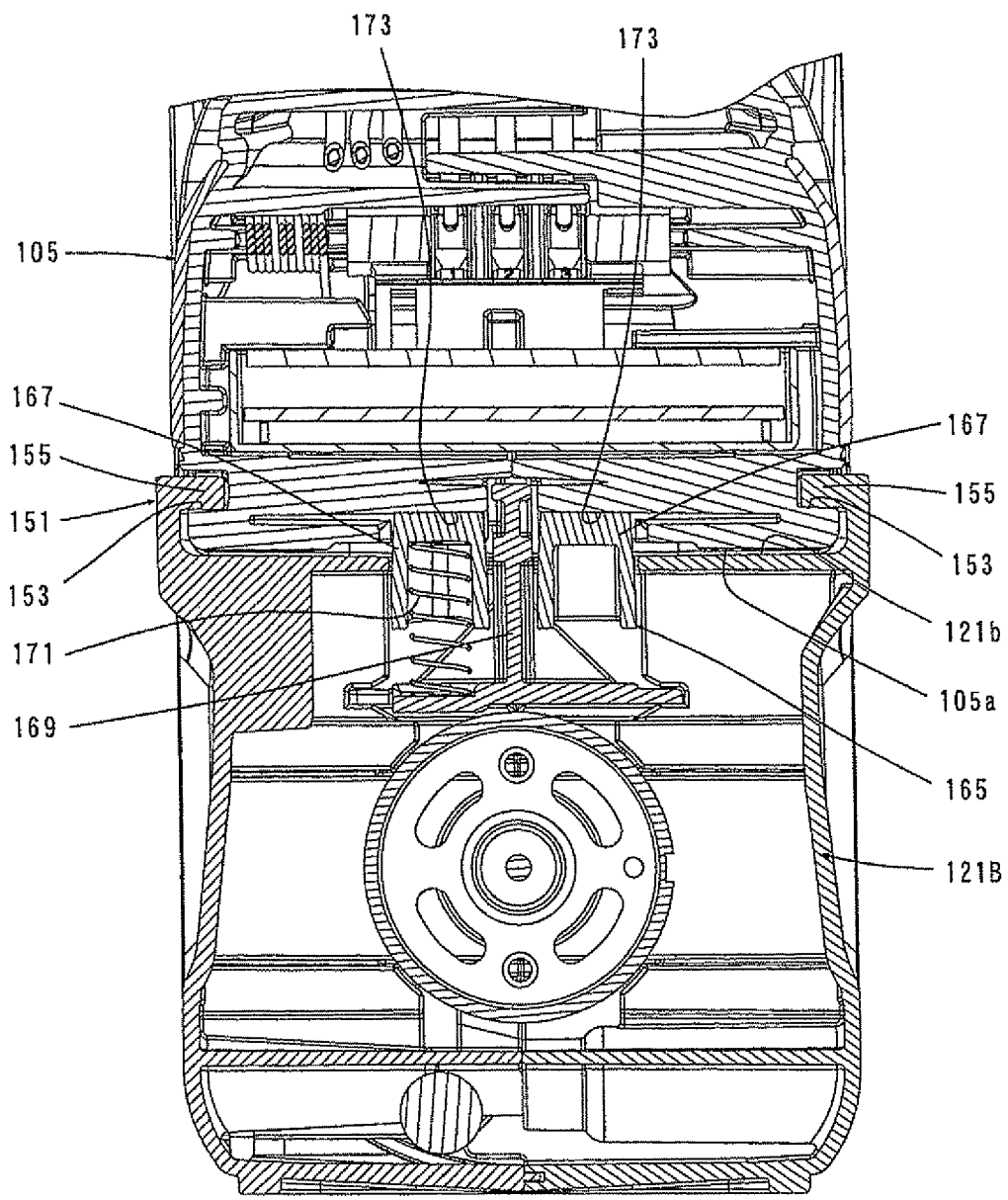
FIG. 4 shows a top cross-sectional view of an engagement mechanism portion and a locking mechanism of the dust catching attachment in a state that the locking mechanism is locking the dust catching attachment.
Figure 5:
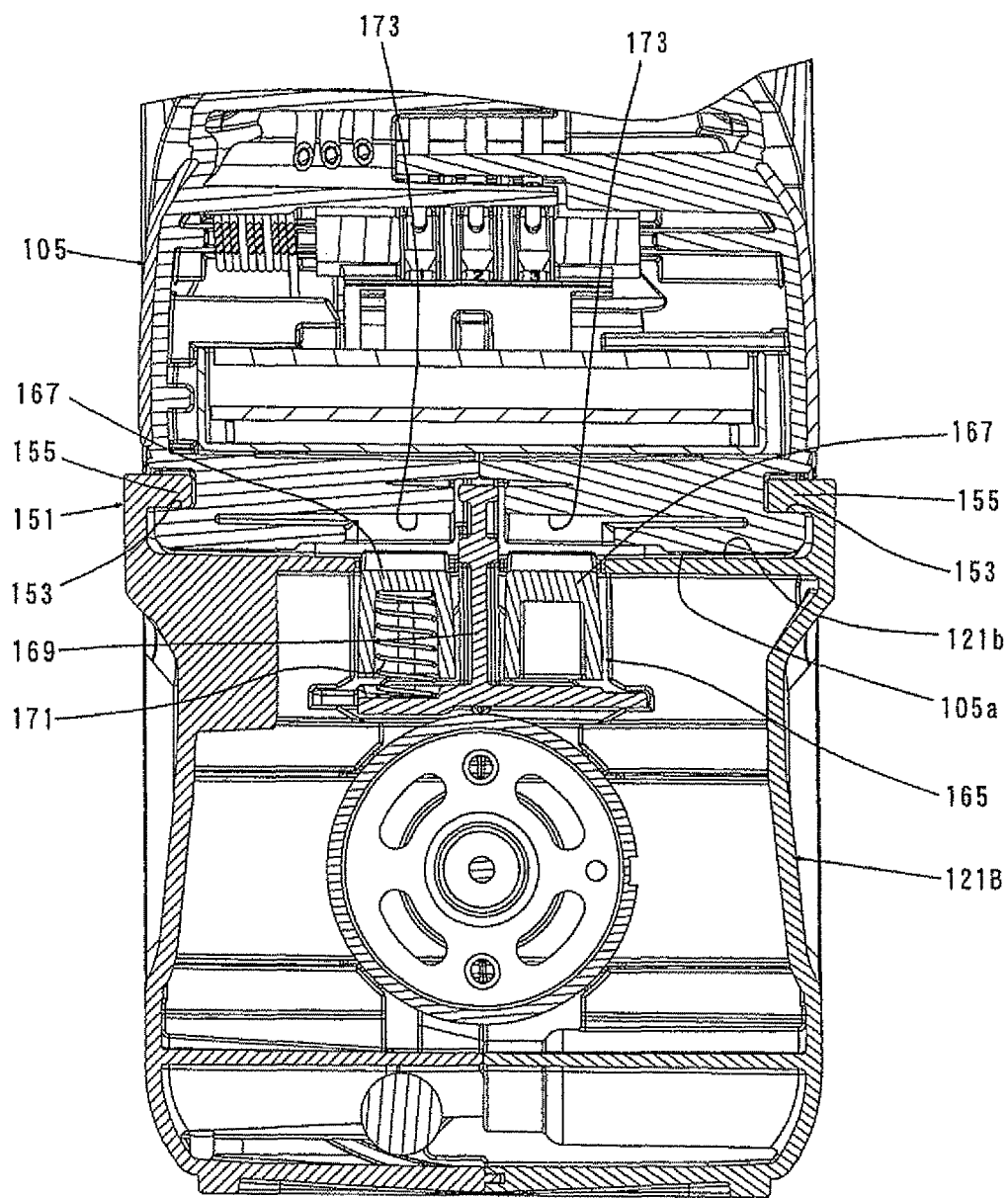
FIG. 5 shows a top cross-sectional view of the engagement mechanism portion and the locking mechanism of the dust catching attachment in a state that the locking mechanism is unlocking the dust catching attachment.

On the other hand, as shown in FIG. 3, in a state that the guide rail 155 is engaged in the guide groove 153, a wedge-shaped member 157 is disposed on the upper surface 137b of the fixed cylinder 137B. The wedge-shaped member 157 is biased against the lower surface 107a of the gear housing 107 thereof the body 103 and the dust catching attachment are pressed not to separate easily. In this way, the wedge-shaped member 157 fills in a gap between the guide rail 155 and the guide groove 153 with respect to a vertical direction.

A substantially rectangular housing box 159 for housing the wedge-shaped member 157 is disposed on the fixed cylinder 13713 and incorporated with the fixed cylinder 13713. An opening is formed at a rear side of the housing box 159. A compression spring 161 is housed in the housing box 159. The wedge-shaped member 157 is housed by the housing box 159 so as to be slidable in the longitudinal direction of the hammer bit 119 with respect to the housing box 159. Further, the wedge-shaped member 157 is biased by the compression spring 161 to rearward in the longitudinal direction of the hammer bit 119 and further a rear portion of the wedge-shaped member 157 is protruded to rearward from the opening of the housing box 159. Further, the wedge-shaped member 157 has an incline surface 157a inclining to downward toward the front side, and a protruding portion 157b at the rear portion of the housing box 157. Namely, the wedge-shaped member 157 has the incline surface 157a facing to the lower surface 107a of the gear housing 107. Further, in a state that the dust catching attachment 120 is detached to the body 103, the protruding portion 157b of the wedge-shaped member 157 contacts with the stopper 163 disposed at the fixed cylinder 137B thereof a maximum protruding position of the wedge-shaped member 157 is defined.

When the dust catching attachment 120 is horizontally relatively moved with respect to the body 103 rearward of the body 103 to make the guide rail 155 to engage to the guide groove 153, the incline surface 157a of the wedge-shaped member 157 is pressed against an incline surface 107b of the lower surface 107a of the gear housing 107. In this connection, the wedge-shaped member 157 is biased by the compression spring 161, thereof the wedge-shaped member 157 elastically supports the body 103 and the dust catching attachment 120. Namely, the wedge-shaped member 157 biases the body 103 and the dust catching attachment 120. In this way, even if a gap exists between the guide rail 155 and the guide groove 153 with respect to a vertical direction, because the wedge-shaped member 157 is elastically located between the upper surface 137b of the fixed cylinder 1373 and the lower surface 107a of the gear housing 107, the gap is filled by means of the wedge-shaped member 157. Therefore, a backlash of the engagement mechanism portion 151 is reduced. Namely, a rotational displacement of the dust catching attachment 120 around the engagement mechanism portion 151 is regulated.

Further, a connector 141 which makes an electrical wiring of the body 103 and an electrical wiring of the dust catching attachment 120 connect to each other is disposed between the attachment body 121 and the body 103. In this embodiment, a male connector 141B of the dust catching attachment 120 is provided with a male connector formed as a protruding member protruding horizontally to rearward from a rear end of the holder attached portion 121A of the attachment body 121. Further, a female connector 141A of the body 103 is provided with a female connector formed as a recessed member recessed and extending rearward at a front portion of the body 103 (motor housing 105). When the dust catching attachment 120 is horizontally moved from a front side to a rear side against the body 103 to be attached to the body 103, the male connector 141B is engaged to the female connector 141A at the time so that a terminal of the electrical wiring of the dust catching attachment 120 is connected to a terminal of the electrical wiring of the body 103. Namely, when the dust catching attachment 120 is attached to the body 103, the dust catching attachment 120 is electrically connected to the body 103. Therefore, when the driving motor 111 is actuated by a pulling movement of the trigger 109a, the motor 123 is also actuated.

Further, as shown in FIG. 4 to FIG. 7, a locking mechanism 165 for locking the dust catching attachment 120 against the body 130 is disposed at the motor housing portion 121B of the attachment body 121. The locking mechanism 165 corresponds to a locking member of the invention. The locking mechanism 165 is provided with a locking portion 167 and an unlocking member 175. The locking portion 167 is disposed at an upper side in the motor housing portion 121B so as to be guided by a guide member 169 thereof the locking portion 167 is movable in a vertical direction crossing a direction of a movement of the dust catching attachment 120 to attach to the body 103. The direction of the movement of the dust catching attachment 120 is defined by a direction of movement of the guide rail 155 to engage to the guide groove 153. Further, the locking portion 167 is biased by the compression spring 171 to upward so as to be protruded to upward from the motor housing portion 121B through an opening disposed on an upper wall of the motor housing portion 121B. The locking opening 173 which opens to downward and is engageable to the locking portion 167 is disposed at a lower wall of the motor housing 105.

An incline surface 167a is formed at a distal end of the locking portion 167. When the dust catching attachment 120 is relatively moved to attach to the body 103, at first the incline surface 167a is pushed by the lower surface 105a of the motor housing 105 thereof the locking portion 167 is displaced to downward against a biasing force of the compression spring 171. And then, when the dust catching attachment 120 is finished relatively moving, a upper portion of the locking portion 167 faces a locking opening 173 of the motor housing 105 and further the locking portion 167 is displaced to upward by the biasing force of the compression spring 171 thereof the locking portion 167 is engaged to the locking opening 173. Therefore, the dust catching attachment 120 is attached and fixed against the body 103 and regulated to move to be detached. The state described above is shown in FIG. 4.

Figure 6:
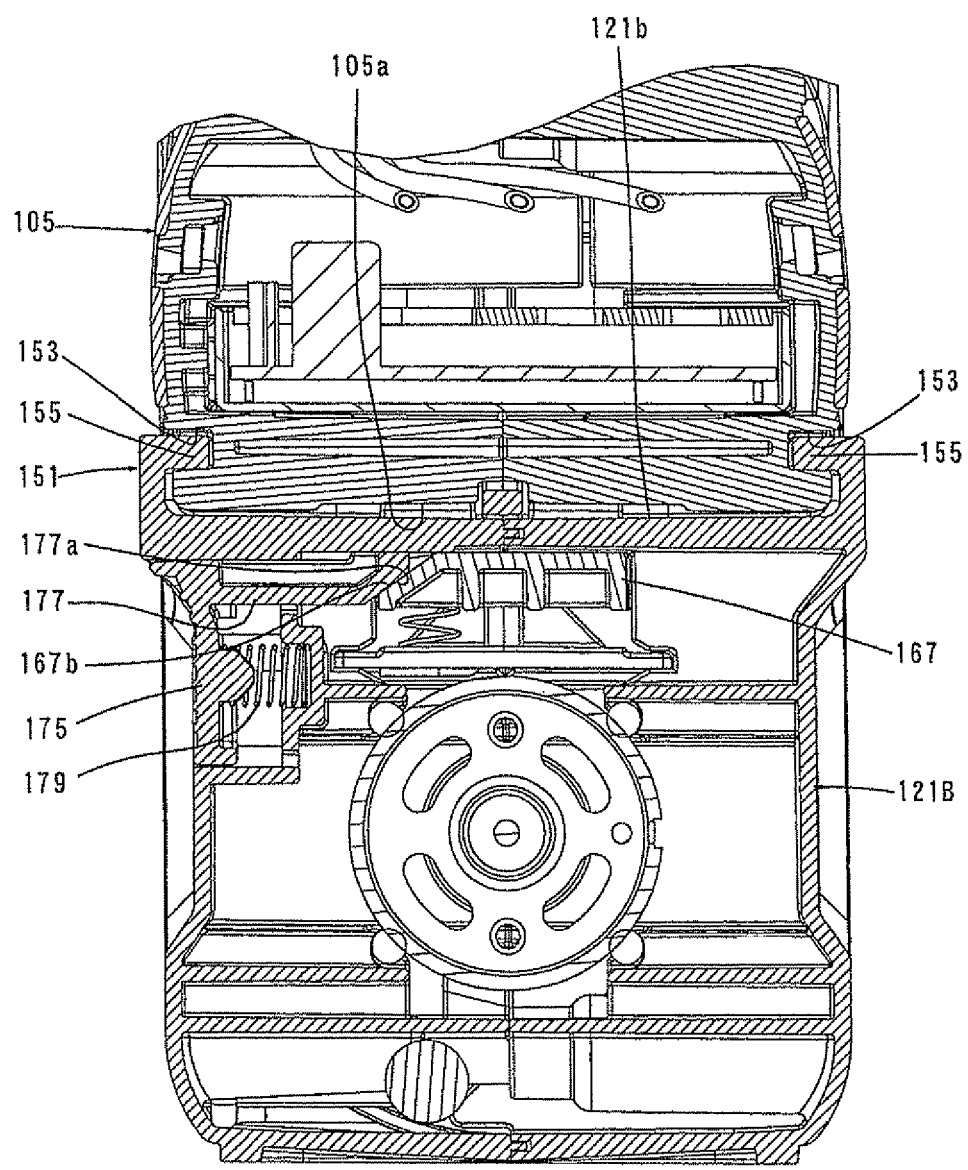
FIG. 6 shows a top cross-sectional view of the engagement mechanism portion and an unlocking lever in a state that the unlocking lever is not operated.
Figure 7:
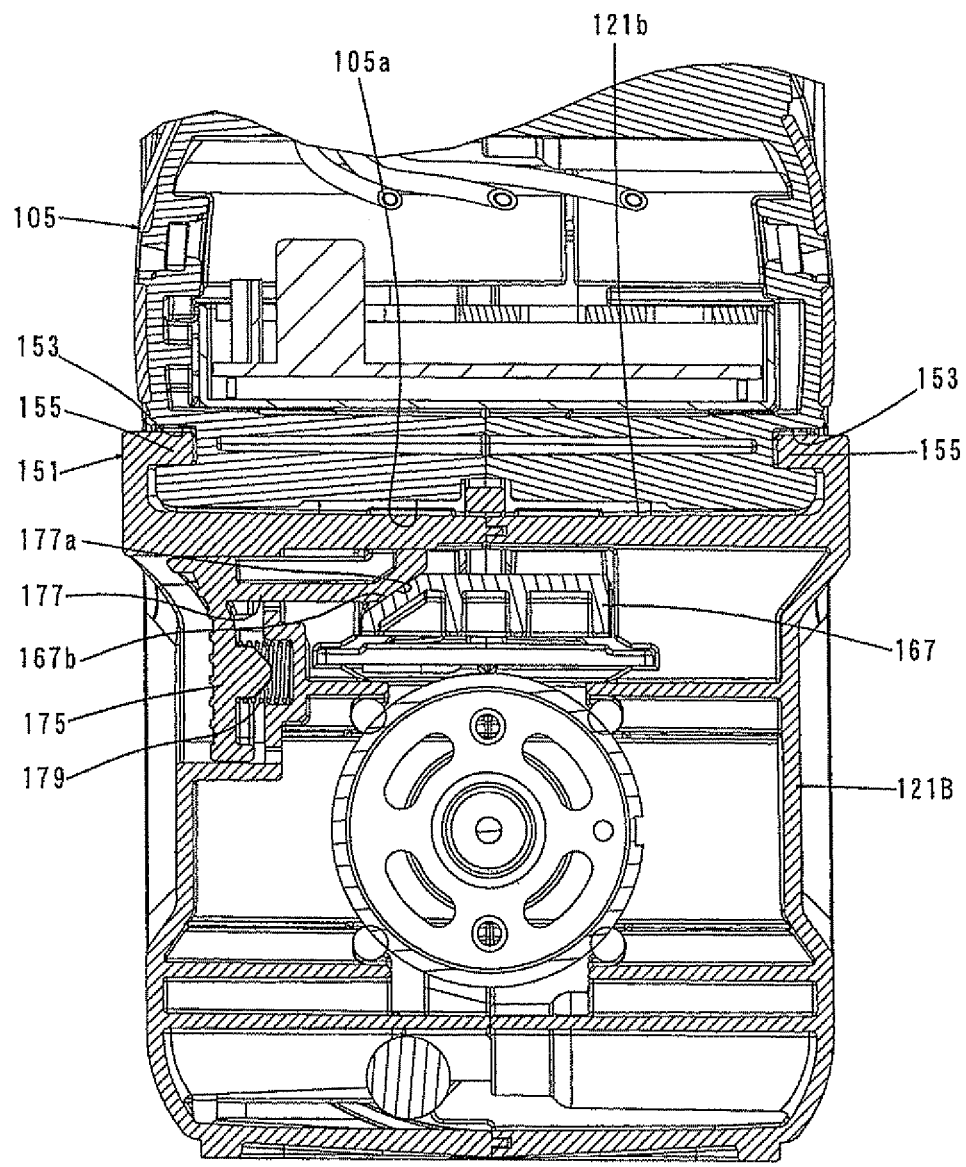
FIG. 7 shows a top cross-sectional view of the engagement mechanism portion and the unlocking lever in a state that the unlocking lever is operated so as to unlock a locking of the dust catching attachment.

As shown in FIG. 6 and FIG. 7, the unlocking member 175 is provided with a button which is disposed at a side wall of the motor housing portion 121B and adapted to be horizontally pressed from the outside of the side wall. The unlocking member 175 has an arm portion 177 which extends horizontally toward a side surface of the locking portion 167. The arm portion 177 has an incline surface 177a at a distal end of the arm portion 177. In accordance with the incline surface 177a, the incline surface 167b is disposed at a side portion of the locking portion 167 so as to face the incline surface 177a. Accordingly, as shown in FIG. 7, when the unlocking member 175 is pushed horizontally, the incline surface 167b of the locking portion 167 is pushed by the incline surface 177a of the distal end of the arm portion 177 thereof the locking portion 167 is moved to downward. Therefore, an upper part of the locking portion 167 is disengaged from the locking opening 173 thereof a locking of the dust catching attachment 120 to the body 103 is unlocked. The state described above is shown in FIG. 5. Further, the unlocking member 175 is biased by the compression spring 171 toward a part distant from the locking portion 167 thereof the unlocking member 175 is held at a default position. A pushed surface of the unlocking member 175 is adapted to be pushed by a user, and in a state that the unlocking member 175 is positioned at the default position, the pushed surface makes substantially one surface incorporated with a side surface of the motor housing portion 121B.

In this embodiment, the hammer drill 101 and the dust catching attachment 120 are comprised described above. In a case when the dust catching attachment is attached to the hammer drill 101, at first a rear end of the guide rail 155 of the dust catching attachment 120 is positioned at a front end of the guide groove 153 of the motor housing portion 12113. And then, the dust catching attachment 120 is horizontally moved to rearward against the body 103 thereof the guide rail 155 is engaged in the guide groove 153. On the way of the moving, the incline surface 157a of the wedge-shaped member 157 contacts with the incline surface 107b of the lower surface of the body 103. After the incline surface 157a contacts with the incline surface 107, the dust catching attachment is further displaced to an attached position thereof the wedge-shaped member 157 is displaced against the biasing force of the compression spring 161 and displaced forward with respect to the attachment body 121. Therefore, the wedge-shaped member 157 is pressed against the body 103 by a predetermined compression force.

Accordingly, the wedge-shaped member 157 is disposed elastically between the upper surface 137b of the fixed cylinder 137E and the lower surface 107a of the gear housing 107. Therefore, a gap between the guide rail 155 and the guide groove 153 with respect to the vertical direction is filled thereof a backlash of the engagement mechanism portion 151 is reduced. Namely, a rotational displacement of the dust catching attachment 120 around the engagement mechanism portion 151 is regulated. Therefore, the dust catching attachment is stably attached to the body 103.

Further, the wedge-shaped member 157 disposed on the attachment body 121 is pressed elastically to the body 103 thereof the wedge-shaped member 157 elastically supports the dust catching attachment 120 and the body 103, in other word the wedge-shaped member 157 biases the dust catching attachment 120 and the body 103. Therefore, making a special form on the body 103 to be attached by the dust catching attachment 120 is not necessary. Accordingly, the engagement mechanism portion 151 is more simplified than an example composition of the engagement mechanism portion in which a plurality of components of an engagement mechanism portion disposed respectively at plural areas is included.

Further, in this embodiment, a direction of an engaging movement of the guide rail 155 when the guide rail 155 is engaged to the guide groove 153, and a direction of the biasing force which the compression spring 161 biases the wedge-shaped member 157 is corresponded and aligned to each other. Therefore, an attaching operation of the dust catching attachment 120 to the body 103 is achieved by a one-touch operation which the dust catching attachment 120 is relatively moved horizontally against the body 103, thereof the attaching operation is simplified and improved.

On the other hand, when the dust catching attachment is being attached to the body 103, the male connector 141B of the dust catching attachment 120 is inserted into the female connector 141A of the body 103 thereof the electrical wiring of the dust catching attachment 120 is connected to the electrical wiring of the body 103. Namely, according to this embodiment, a direction of an attaching movement of the dust catching attachment 120 to the body 103, and a direction of a connecting of the connector 141 is corresponded and aligned to each other. Accordingly, the connector 141 is automatically connected by the attaching movement of the dust catching attachment 120 to the body 103.

Further, when the dust catching attachment 120 is being attached to the body 103, the incline surface 167a of the locking portion 167 is pushed by the lower surface 105a of the motor housing 105 thereof the locking portion 167 is displaced to downward against the biasing force of the compression spring 171. And then, when the dust catching attachment 120 is moved to a predetermined attached position, namely the dust catching attachment 120 is positioned at the attached position, the locking portion 167 faces the locking opening 172. Therefore, the locking portion 167 is displaced to upward by the biasing force of the compression spring 171 thereof the locking portion 167 engages the locking opening 173. In this way, the dust catching attachment 120 is attached and locked to the body 103 and regulated to move so as to be detached. Namely, when an attaching operation of the dust catching attachment 120 to the body 103 is achieved, a locking of the dust catching attachment to the body 103 is automatically achieved.

According to this embodiment described above, the dust catching attachment 120 is positioned at a front side of the body 103 of the hammer drill 101 so that the guide rail 155 and the guide groove 153 are positioned to engage to each other, and then the dust catching attachment 120 is moved horizontally to rearward to the body 103 thereof the dust catching attachment 120 is attached at a lower and front part of the body 103 of the hammer drill 101.

Further, in a case that the dust catching attachment 120 is detached from the body 103, when the unlocking member 175 is pushed, the locking portion 167 is displaced to downward against the biasing force of the compression spring 171 by the arm portion 177 of the unlocking member 175 thereof the locking portion 167 is disengaged to the locking opening 173. After the locking of the locking portion 167 is cancelled, the dust catching attachment 120 is detached from the body 103 by being moved forward distantly from the body 103.

Further, according to this embodiment, the engagement mechanism portion 151 which comprises the guide rail 155 and the guide groove 153 is disposed between the upper surface 121b of the motor housing portion 121B and the lower surface 105a of the motor housing 105. Further, the wedge-shaped member 157 is disposed between the upper surface 137b of the fixed cylinder 137B and the lower surface 107a of the gear housing 107. Accordingly, a relative rotational movement of the dust catching attachment 120 around the engagement mechanism portion 151 with respect to the body 103 is regulated by the wedge-shaped member 157 which is disposed distantly from the engagement mechanism portion 151. In this case, the rear surface 121a (and the front surface 105b) is disposed between the upper surface 121b (and the lower surface 105) and the upper surface 137b (and the lower surface 107a), therefore the upper surface 121b (and the lower surface 105a) and the upper surface 137b (and the lower surface 107a) are disposed separately to each other effectively.

Further, a construction of this embodiment may be changed accordingly. For example, the guide rail 155 may be disposed on the body 103 and the guide groove 153 may be disposed on the motor housing portion 121B. Further, a position of the engagement mechanism portion 151 and a position of the wedge-shaped member 157 may be replaced to each other. Further, the wedge-shaped member 157 may be disposed between the rear surface 121a of the holder attached portion 121A and the front surface 105b of the motor housing 105. In this case, the wedge-shaped member 157 may be vertically biased by the compression spring 161, and the incline surface 157a of the wedge-shaped member 157 may be contacted with the front surface 105b of the motor housing 105. Further, the wedge-shaped member 157 may be disposed between the upper surface 121b of the motor housing portion 121B and the lower surface 105a of the motor housing 105.

Further, in this embodiment, the dust catching attachment 120 was explained in a case that the dust catching attachment 120 is attached to the hammer drill 101, besides the dust catching attachment 120 may be attached to other power tool which produces a dust by an operation of the power tool.

Having regard to an aspect of the invention, following features are provided:

(Feature 1)

A power tool comprising:

a tool body;

a dust catching device attachable to the tool body;

an engagement portion which engages the tool body with the dust catching device; and a spacing member which is disposed between the tool body and the dust catching device in a state that the tool body and the dust catching device are engaged to each other by the engagement portion, and which elastically supports the tool body and the dust catching device.

(Feature 2)

A power tool comprising:

a tool body;

a dust catching device attachable to the tool body;

an engagement portion which engages the tool body with the dust catching device; and a spacing member which elastically supports the tool body and the dust catching device in a state that the tool body and the dust catching device are engaged to each other, and disposed between the tool body and the dust catching device, wherein a relative rotational movement of the dust catching device around the engagement portion against the tool body is regulated by means of the spacing member.

(Feature 3)

The power tool according to claim 1 or Feature 1 of Feature 2, the engagement portion includes a recessing portion and a protruding portion respectively extending in a longitudinal direction of a tool bit, wherein the recessing portion and the protruding portion are engaged to each other so as to move in the longitudinal direction.

(Feature 4)

The power tool according to claim 6, wherein the guide groove includes a pair of grooves disposed at a right side wall and a left side wall of the tool body, and wherein the guide rail includes a pair of rails disposed at the dust catching device and respectively corresponding to the pair of grooves.

(Feature 5)

The power tool according to claim 3, the dust catching device has a housing box which houses the wedge-shaped member, the housing box houses the wedge-shaped member so that a part of the wedge-shaped member is protruded from the housing box, wherein a protruding part of the wedge-shaped member includes an incline surface which presses an outside surface of the tool body.

DESCRIPTION OF NUMERALS

101 hammer drill (power tool)
101 hammer drill (power tool)
103 body (tool body)
105 motor housing
105*a* lower surface (first surface)
105*b* front surface (fifth surface)
107 gear housing
107*a* lower surface (second surface)
107*b* incline surface
109 hand grip
109A battery attached portion
109*a* trigger
110 chargeable battery
111 driving motor
113 motion changing mechanism
115 hammering member
117 motion transmission mechanism
118 tool holder
119 hammer bit
119*a* tip portion
120 dust catching attachment (dust catching device)
121 attachment body
121A holder attached portion
121*a* rear surface (sixth surface)
121B motor housing portion
121*b* upper surface (third surface)
123 motor
125 vacuum fan
126 inlet
127 dust holder
128 air outlet
129 filter
131 dust vacuuming portion
133 vacuuming cylinder
133*a* dust inlet
133*b* rear wall
135 vacuuming body
137 dust transmission portion
137A movable cylinder
137E fixed cylinder
137*b* upper surface (forth surface)
139 accordion hose
141 connector
141A female connector
141B male connector
151 engagement mechanism portion (engagement portion)
153 guide groove
155 guide rail
157 wedge-shaped member
157*a* incline surface
157*b* protruding portion
159 housing box
161 compression spring
163 stopper
165 locking mechanism (locking member)
167 locking portion
167*a* incline surface
167*b* incline surface
171 compression spring
173 locking opening
175 unlocking member
177 arm portion
177*a* incline surface
179 compression spring

What is claimed is:

1. A power tool comprising:

a tool body having a tool holder, the tool holder being configured to receive a tool bit such that the tool bit is relatively movable with respect to the tool body in a longitudinal direction of the tool bit;

a dust catching device attachable to the tool body;

an engagement portion configured to engage the tool body with the dust catching device, the engagement portion including a guide groove and a guide rail engageable to the guide groove, the guide groove being provided to one of the tool body and the dust catching device while the guide rail being provided to another of the tool body and the dust catching device, the guide groove and the guide rail extending parallel to the longitudinal direction of the tool bit;

a wedge-shaped member configured to be disposed between the tool body and the dust catching device; and a biasing member that biases the wedge shaped member, wherein the biased wedge-shaped member biases the tool body and the dust catching device in a direction crossing the longitudinal direction of the tool bit in a state that the tool body and the dust catching device are engaged to each other by the engagement portion.

2. The power tool according to claim 1, wherein the biased wedge-shaped member strengthens an attachment between the tool body and the dust catching device by means of the biasing member.

3. The power tool according to claim 1, further comprising a locking member, wherein the locking member locks the engagement portion in a state that the tool body and the dust catching device are engaged to each other by the engagement portion.

4. The power tool according to claim 1, wherein the tool body includes a first surface and a second surface, and the dust catching device includes a third surface and a forth surface, in a state that the tool body and the dust catching device are engaged to each other by the engagement portion, the first surface contacts with the third surface, and the wedge-shaped member is located between the second surface and the forth surface, and the guide groove is disposed at one of the first surface and the third surface, and the guide rail is disposed at another of the first surface and the third surface.

5. The power tool according to claim 1,
wherein the tool body includes a first surface and a second surface, and the dust catching device includes a third surface and a forth surface, and
in a state that the tool body and the dust catching device are engaged to each other by the engagement portion, the first surface contacts with the third surface, and the wedge-shaped member is located between the second surface and the forth surface.

6. The power tool according to claim 4,
wherein the first surface and the second surface are located distantly to each other, and
wherein the third surface and the forth surface are located distantly to each other.

7. The power according to claim 4,
wherein the tool body includes a fifth surface connecting to the first surface and the second surface, and the dust catching device includes a sixth surface connecting to the third surface and the forth surface, and
in a state that the tool body and the dust catching device are engaged to each other by the engagement portion, the fifth surface contacts with the sixth surface.

8. The power tool according to claim 1,
wherein the power tool is defined as a hammer drill which actuates a tool attached on a front portion of the tool body along a longitudinal direction of the tool and around the longitudinal direction of the tool, and
wherein the tool body includes an attached portion to which the dust catching device is attached.

9. A power tool comprising:
a tool body configured to receive a tool bit operated by a motor disposed inside the tool body;
a dust catching device attachable to the tool body, the dust catching device including an attachment body housing another motor and a vacuum fan which is operated by the other motor, the dust catching device being slidably attached to the tool body;
a first electrical connector formed on the dust catching device, the first electrical connector extending a direction parallel to a longitudinal direction of the tool bit, the first electrical connector being electrically connected to the other motor,
a second electrical connector formed on the tool body, the second electrical connector extending in the direction parallel to the longitudinal direction of the tool bit, the second electrical connector being electrically connected to the first electrical connector when the dust catching device is slidably attached to the tool body in the longitudinal direction of the tool bit,
a wedge-shaped member that is attached to an outer surface of the dust catching device, and
a biasing member that biases the wedge-shaped member,
wherein the wedge-shaped member is disposed between the tool body and the dust catching device when the dust catching device is slidably attached to the tool body so that the biased wedge-shaped member reduces a backlash between the dust catching device and the tool body by a force of the biasing member.

* * * * *